United States Patent
Meyer

(10) Patent No.: US 6,533,570 B2
(45) Date of Patent: Mar. 18, 2003

(54) EXTRUDER DIE HEAD

(75) Inventor: Ulrich Meyer, Ibbenbueren (DE)

(73) Assignee: Windmoeller & Hoelscher, Lengerich (DE)

( * ) Notice: Subject to any disclaimer, the term of this patent is extended or adjusted under 35 U.S.C. 154(b) by 0 days.

(21) Appl. No.: 09/759,255

(22) Filed: Jan. 16, 2001

(65) Prior Publication Data

US 2001/0008642 A1 Jul. 19, 2001

(30) Foreign Application Priority Data

Jan. 14, 2000 (DE) .......................................... 100 01 363

(51) Int. Cl.[7] .............................................. B29C 49/00
(52) U.S. Cl. .................... 425/380; 425/381.2; 425/462; 425/467
(58) Field of Search ............................. 425/133.1, 380, 425/381.2, 462, 467

(56) References Cited

U.S. PATENT DOCUMENTS

| | | | | |
|---|---|---|---|---|
| 3,966,377 A | * | 6/1976 | Upmeier et al. | 264/514 |
| 4,182,603 A | * | 1/1980 | Knittel | 425/133.1 |
| 4,201,532 A | * | 5/1980 | Cole | 425/326.1 |
| 4,298,325 A | * | 11/1981 | Cole | 425/133.1 |
| 5,034,179 A | * | 7/1991 | Richter | 264/171.27 |
| 5,069,612 A | * | 12/1991 | Teutsch et al. | 264/171.12 |
| 5,076,776 A | * | 12/1991 | Yamada et al. | 156/500 |
| 5,256,051 A | * | 10/1993 | Langos et al. | 425/133.1 |
| 5,261,805 A | * | 11/1993 | Gates | 425/380 |
| 5,393,216 A | * | 2/1995 | Teutsch et al. | 264/173.12 |
| 5,538,411 A | * | 7/1996 | Gates | 264/171.27 |
| 6,077,062 A | * | 6/2000 | Guillemette et al. | 425/113 |
| 6,305,922 B1 | * | 10/2001 | Gates | 425/133.1 |

FOREIGN PATENT DOCUMENTS

WO       88/01226       2/1988

* cited by examiner

*Primary Examiner*—Jan H. Silbaugh
*Assistant Examiner*—Joseph S. Del Sole
(74) *Attorney, Agent, or Firm*—Jacobson Holman PLLC

(57) ABSTRACT

An extruder die head, preferably a blown film head, comprises an internal cylindrical mandrel and a jacket, which envelops concentrically said mandrel. Between said mandrel and jacket an annular channel is formed that empties into a die slit. The invention also comprises at least one line, which empties into the annular channel in the area opposite the die slit and which feeds a melt. To prevent a slit between the central mandrel and the jacket, enclosing said mandrel, where the polymer melt could accumulate and deposit, the mandrel is made as one piece with a flange-shaped foot. The jacket rests with its bottom face sealingly on the annular surface of the flange-shaped foot and is connected, for example fastened, to the same. The annular channel extends from the peripheral surface of the mandrel to the flange-shaped foot up to and into the transition region. The line, feeding in a melt, empties into this transition region.

14 Claims, 6 Drawing Sheets

EXTRUDER DIE HEAD

BACKGROUND OF THE INVENTION

Field of the Invention

The invention relates to an extruder die head, preferably a blown film head, comprising an internal cylindrical mandrel and a jacket, which envelops concentrically the mandrel. Between the mandrel and jacket an annular channel is formed that empties into a die slit. The invention also comprises at least one line, which empties into the annular channel in the area opposite the die slit and which feeds a melt.

Blown film heads of this type exist. Usually the mandrel exhibits one or several helical groove(s), whose depth decreases in the direction of the die slit, starting from the feed channel(s), so that the polymer melt overflows more and more the webs, which define the channels, and assumes a uniform flow in the axial direction. The prior art extruder die heads exhibit the special problem that the mandrel on the other side of the beginning of the annular channel is fitted sealingly into a cylindrical borehole of the jacket. If, however, the extruder die head becomes warm due to the polymer melt, flowing through the extruder die head, the jacket expands more, on account of its larger diameter, than the central mandrel so that between the two of them a slit forms, into which penetrates the polymer melt that is fed in under pressure. Since the melt can accumulate in the area of this slit and because of its long residence time in the hot die head, where it can decompose and become brittle, particles of the deposited and incrusted melt can be dragged along. The particles become obvious in the extruded film tube or the inflated film bubble as the defective spots.

SUMMARY OF THE INVENTION

Therefore, the object of the invention is to provide an extruder die head of the type designated in the introductory part, wherein there is no slit between the central mandrel and the jacket, enveloping said mandrel, in which the polymer melt can accumulate and deposit.

The invention solves this problem by means of a first embodiment in that the mandrel is made as one piece with a flange-shaped foot and the jacket rests with its bottom face sealingly on the annular surface of the flange-shaped foot and is connected, for example fastened, to the same; that the annular channel extends from the peripheral surface of the mandrel to the flange-shaped foot up to and into the transition region; and that the line, feeding in a melt, empties into this transition region.

Since the bottom face of the jacket rests sealingly on the annular surface of the flange-shaped foot and since the mating surfaces of complementary shape are connected permanently together and preferably braced, there is no slit between the face and the annular surface, into which the melt could penetrate.

A preferred embodiment provides that the flange-shaped foot, adjacent to the mandrel, is provided with one or several spiral grooves, which run helically over the transition region into the peripheral surface of the mandrel and whose depth decreases in the direction of the die slit and which have their start in the foot and in whose initial region the boreholes, feeding in the melt, empty. In this embodiment the edges of the groove(s), worked into the flange-shaped foot, are sealed by means of the faces, which cover said grooves and belong to the jacket, opposite the annular surface of the foot.

A second embodiment solves the problem in that the mandrel is put into a blind borehole of a die body, which forms the jacket and whose inside wall defines with the mandrel the annular channel; that the channel extends between the peripheral surface of the mandrel and its face up to and into the transition region; that the melt-feeding line empties into this transition region; and that the face of the mandrel inside the transition region rests sealingly on the floor of the blind borehole and is connected, for example fastened, to the same.

Preferably the peripheral region of the face of the mandrel is provided with one or several spiral grooves, which run helically over the transition region into the peripheral surfaces of the mandrel and have their start in the peripheral region of the face and whose depth decreases in the direction of the die slit; and that the melt-feeding boreholes empty into the initial regions of the grooves.

A third embodiment solves the problem with an extruder die head, preferably a blown film head, which comprises a die body, which forms the floor and on which an inside rotationally symmetrical core with sealing face is mounted and connected, for example fastened, to the same, and comprising at least two rings, which envelop the core and whose faces rest sealingly against complementary annular surfaces of the floor and are connected, for example, fastened, to the same, whereby the core with the ring, enclosing it, and the rings, which enclose each other, define annular channels, which empty into a common die slit, whereby the annular channels extend up to and into the transition regions of the peripheral surface of the core and the rings to their faces and whereby the melt-feeding channels empty into these transition regions.

This extruder die head of the invention enables a coextrusion process, whereby between the faces of the core and the rings, enclosing said core, and the floor there are no slits, into which the melt could penetrate.

A preferred embodiment provides that the peripheral regions of the faces of the core and the rings are provided with one or several spiral grooves, which run helically or spirally over the transition regions into the peripheral regions of the mandrel or the rings and have their start in the peripheral regions and whose depth decreases in the direction of the die slit, whereby the melt-feeding boreholes empty into the initial regions of the grooves.

Expediently the transition regions are rounded off so that the melt can flow with laminar flow over them and beyond.

Expediently the faces are fastened by means of expansion screws to the floor or annular surfaces.

The faces, which mate sealingly, are complementary to each other and designed preferably flat.

If the extruder die heads are blown film heads, there are additionally boreholes, (not illustrated) which penetrate the blown film head and through which blowing air can be fed and also exhausted again for the purpose of inflating the extruded film tube into a tubular bubble and for the purpose of cooling.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DRAWINGS

Embodiments of the invention are explained in detail below with reference to the drawings.

DESCRIPTION OF THE INVENTION

Figure 1:
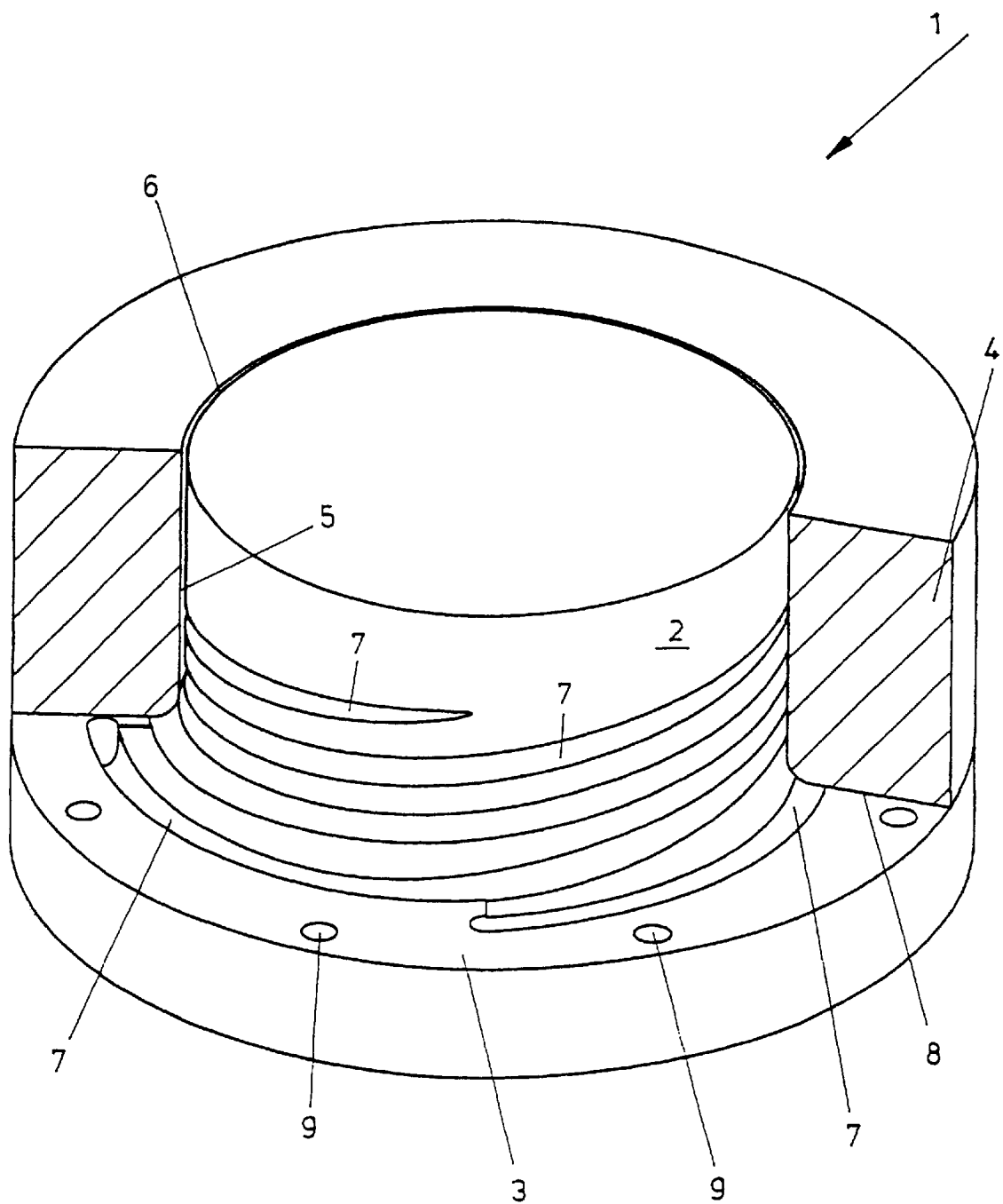
FIG. 1 is a schematic drawing of a perspective view of an extruder die head, whose mandrel, provided with a flange-shaped foot, is enclosed by a cylindrical jacket, which is cut.

Although only a few preferred embodiments of the invention are explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

The extruder die head 1, apparent from FIG. 1, comprises a central cylindrical mandrel 2, which is made as one piece and connected to a flange-shaped foot 3. The mandrel 2 is enclosed by a cylindrical ring 4, which forms a jacket and between whose inside wall and the mandrel 2 there is formed an annular channel 5, which empties into the die slit 6. Starting from the inside peripheral region of the flange-shaped foot 3, there are several rows of spiral grooves 7, which are worked into said region and which extend over the transition region from the flange-shaped foot 3 to the cylindrical mandrel 2 and continue to run on the mandrel in several helical rows. The depth of the grooves 7 decreases in the direction of the die slit 6, so that the melt, flowing in the grooves, is rerouted more and more in the axial direction and overflows the webs, defining the grooves. The transition region between the flange-shaped foot and the cylindrical mandrel 2 is rounded off in the illustrated manner.

Figure 2:
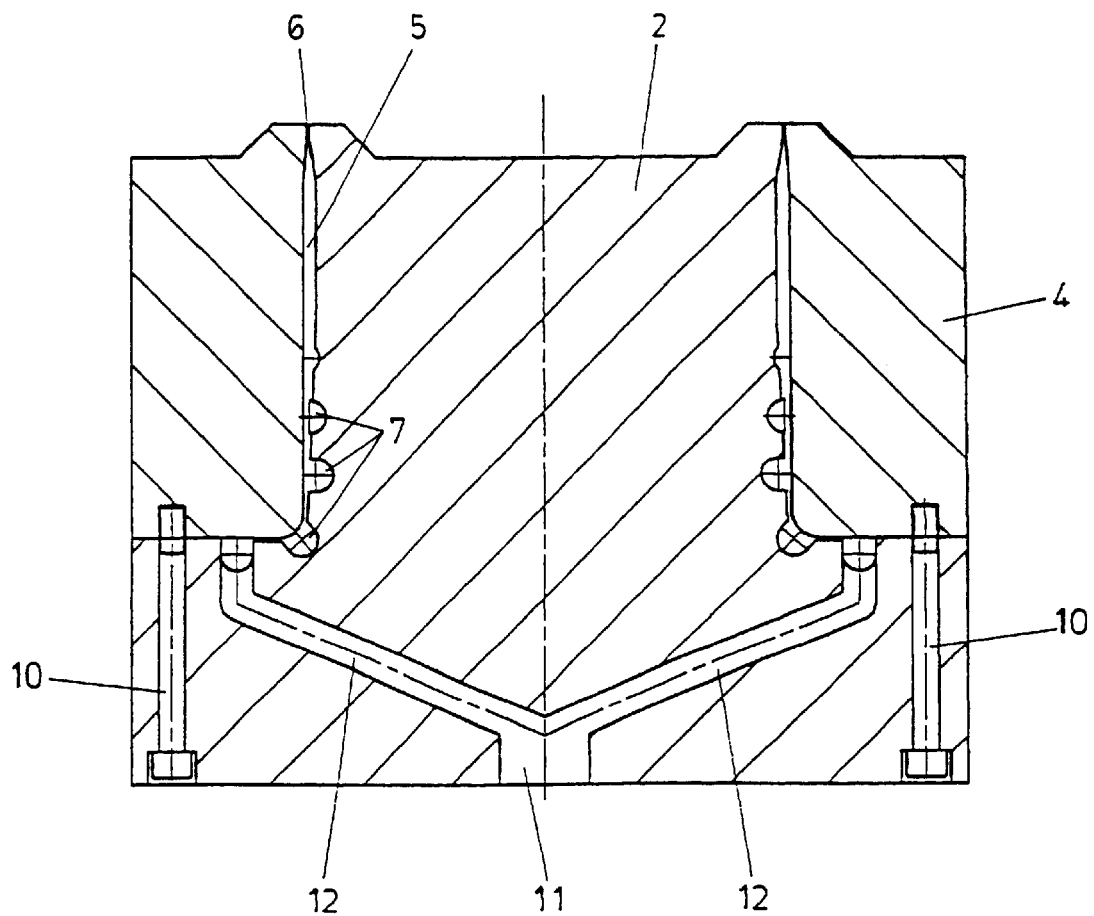
FIG. 2 is a sectional view of the extruder die head, according to FIG. 1.

The cylindrical ring 4 exhibits a bottom radial flat face 8, with which it rests on the radial flat annular surface of the flange-shaped foot 3. The flange-shaped foot 3 is provided with boreholes 9, through which expansion screws 10 are inserted in the manner apparent from FIG. 2. Said expansion screws are screwed into the corresponding threaded boreholes of the cylindrical ring 4. Owing to these expansion screws 10 the cylindrical ring 4 is braced with its surface 8 against the annular surface 3 of the flange-shaped foot, so that the face and ring surfaces, which are connected together in this manner, lie without a gap and matingly on each other. To the extent outside the curved transition region the face 8 of the cylindrical ring 4 lies on the region of the annular surface of the flange-shaped foot 3, into which the grooves 7 are cut, the ring 4 braces itself against the edges of the webs that define the grooves.

The polymer melt is fed by an extruder through the channels 11, 12 to the initial regions of the grooves 7, which are closed with respect to the flange-shaped foot 3. Said melt issues from the grooves 7 in the transition region between the flange-shaped foot 3 and the mandrel 2 and enters into the annular channel 5 and then flows with increasing axial flow to the annular slit 6.

The flange-shaped foot or the bottom part of the extruder die head is constructed in the known manner in the shape of a disk, in order to design the channel system 11, 12 in the customary manner by means of boreholes.

In the transition region between the flange-shaped foot 3 and the mandrel 2, the inside corner of the cylindrical ring 4 is also round off correspondingly so that the annular channel extends up to and into this transition region, from where it exits.

Figure 3:
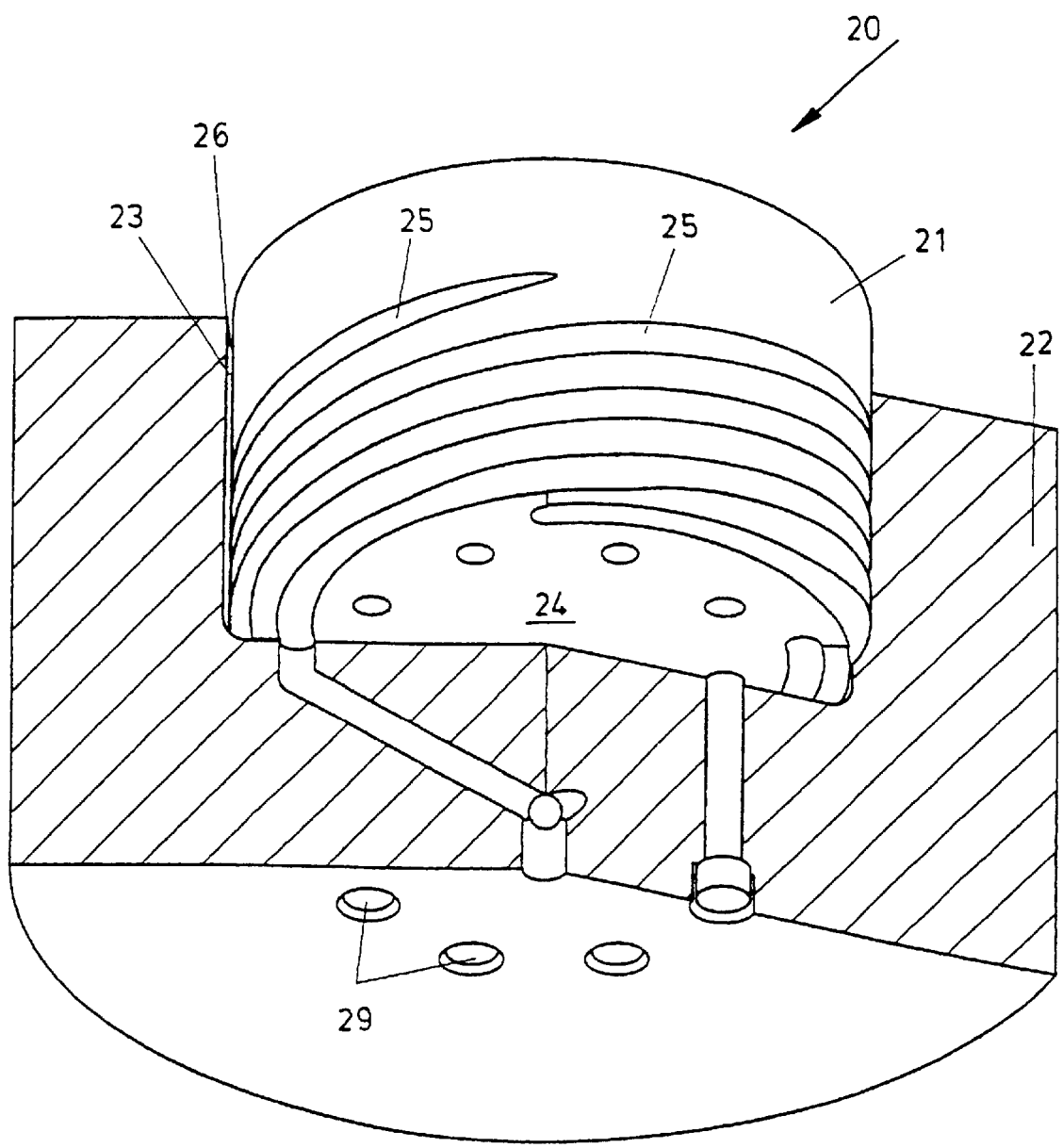
FIG. 3 is a perspective view of an extruder die head, where the cylindrical mandrel is put into a die body, which is provided with a blind hole and which is cut.

FIG. 3 depicts a second embodiment of a die head 20, where the cylindrical mandrel 21 is put into a blind borehole of a die body 22, thus forming the annular channel 23 between the inside wall of the borehole and the periphery of the mandrel 21.

Figure 4:
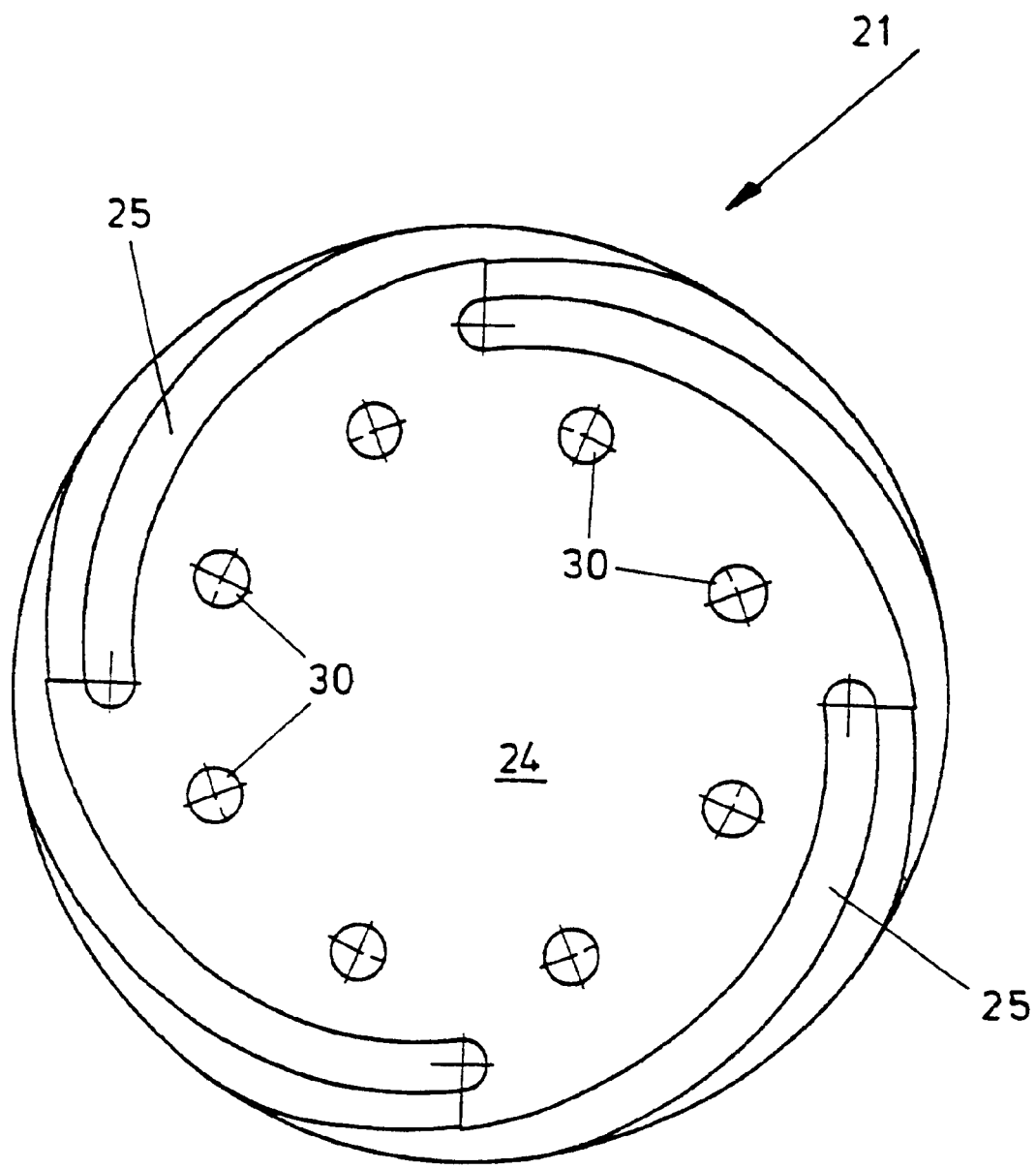
FIG. 4 is a bottom view of the mandrel, according to FIG. 3.
Figure 5:
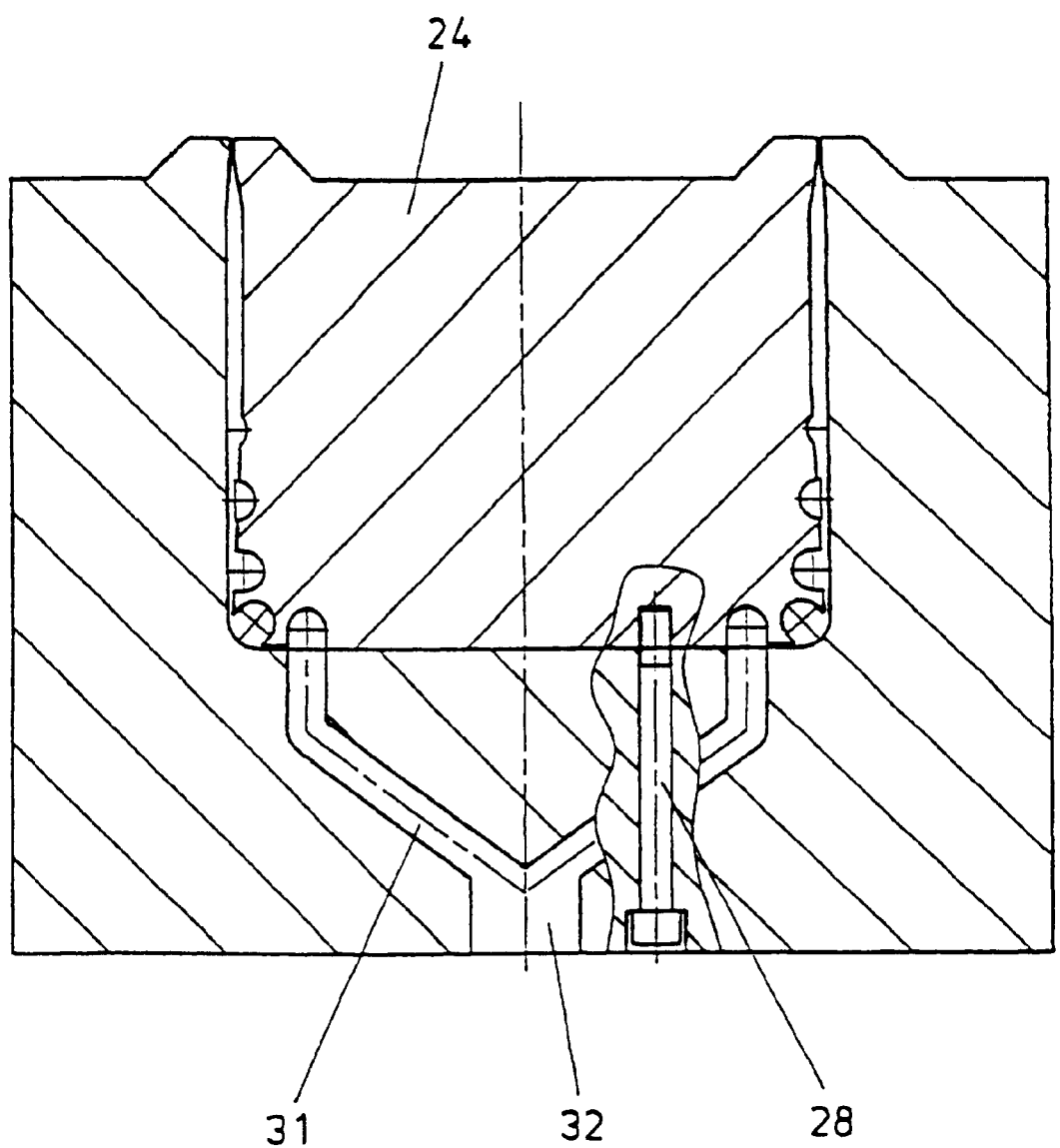
FIG. 5 is a sectional view of the extruder die head, according to FIG. 3.

As especially apparent from FIG. 4, the mandrel 21 exhibits, starting from the peripheral region of its flat face 24, spiral grooves 25, which run over the rounded off transition region between the face 24 and the periphery of the mandrel 21 and continue in several helical rows over the periphery of the mandrel 21. The grooves 25 are designed with a depth that decreases in the direction of the die slit 26 so that the melt overflows more and more in the axial direction the webs of the grooves and assumes an axial flow in the annular channel 23.

The floor of the drilled and ground blind borehole is designed flat and parallel to the face 24 so that the face and the floor mate sealingly. The mandrel 24 is fastened to the floor with tightening screws 28, which penetrate the boreholes 29 of the floor of the die body 22 and are screwed into threaded boreholes 30 of the face of the mandrel 24. Hence the face 24 of the mandrel 21 lies with its surface, which is apparent from FIG. 4 and which is marked with a closed circumferential line, flush on the flat floor of the blind hole.

The melt-feeding channels 31, 32 empty into the initial regions of the grooves 24.

Figure 6:
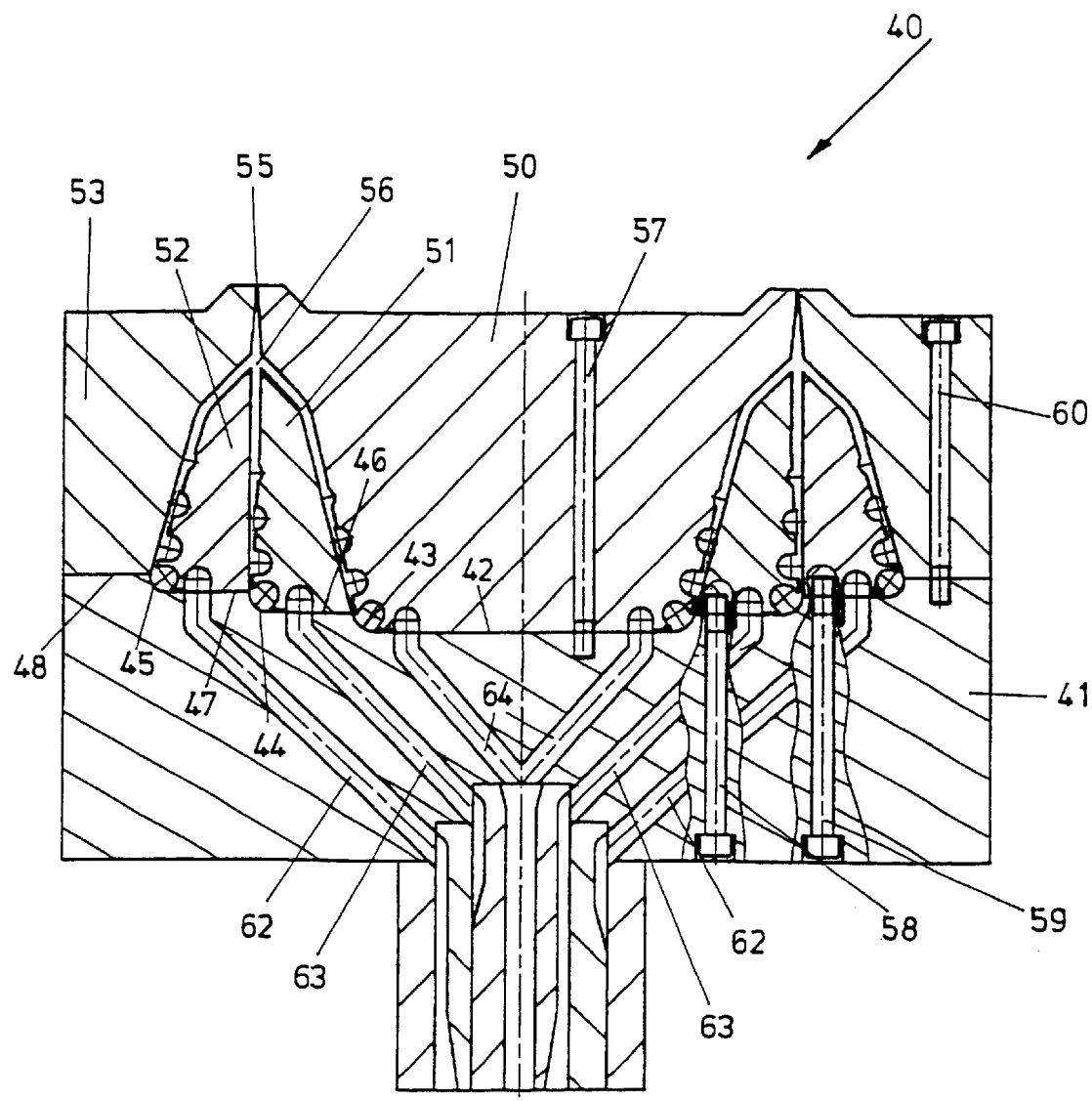
FIG. 6 is a sectional view of an extruder die head for coextrusion of three types of polymer melt.

FIG. 6 depicts a third embodiment of the extruder die head 40, which serves to coextrude three types of melt. The die head 40 comprises a die body 41, which forms the floor and whose central region exhibits a circular disk-shaped depression 42 with a flat floor. Adjoining this circular disk-shaped depression via rounded off steps 43, 44, 45 are annular surfaces 46, 47, 48. Into the central depression 42 is inserted a rotationally symmetrical core 50, which expands in the illustrated, starting from its face, in the outward direction by means of conical segments. On the annular surfaces 46, 47, 48 are mounted rings 51, 52, 53, which exhibit annular flat bottom faces and thus rest sealingly on the concentric annular surfaces 46, 47, 48. Several grooves are cut spirally into the flat face of the central core 50. Said grooves travel beyond the rounded off edges and extend over the jacket of the bottom conical part and decrease in depth, as illustrated, in the direction of the die slit 55.

Correspondingly grooves are cut spirally into the bottom annular faces of the rings 51, 52. Said grooves also run over the transition regions, formed by the rounded off edges, into the peripheral surfaces of the rings 51, 52 and decrease in depth in the direction of the die slit 55. Between the central core 50 and the ring 51 as well as between the rings 51 and 52 and 52 and 53 there are annular channels, which empty into one another at the common intersection 56 and, starting from there, continue in the direction of the die slit 56.

The central core 50 is fastened by means of expansion screws 57 to the die body 41.

The rings 51, 52, 53 are fastened by means of expansion screws 58, 59, 60 to the die body 41. Since the central core and the rings 51, 52, 53 rest with flat faces on complementary flat floors or annular surfaces of the die body 41 and are fastened to the same, the results are gapless seals so that the supplied melt can rise to the die gap 55 only through the cut grooves and the annular channels without accumulating in the slits or corners and becoming brittle. The three melts are fed through the channels 62, 63, 64 to the initial regions of the grooves.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. An extruder die head, including an internal cylindrical mandrel and a jacket, which concentrically envelops said mandrel and between which an annular channel is formed that empties into a die slit and at least one line, which empties into said annular channel in an area opposite the die slit for feeding a melt, wherein the improvement comprises a flange-shaped foot extending from said mandrel as one piece to form an annular surface, and said jacket having a bottom face sealingly on the annular surface of said flange-shaped foot; said annular channel extending from a peripheral surface of said mandrel to said flange-shaped foot up to and into a transition region; said at least one line feeding the melt into said transition region, said flange-shaped foot having at least one spiral groove for feeding in the melt, said at least one spiral groove helically running over said transition region into said peripheral surface of said mandrel, having a depth decreasing in a direction of the die slit and starting in said flange-shaped foot in an initial region receiving the melt.

2. The extruder die head, as claimed in claim 1, wherein said transition region is rounded off.

3. The extruder die head, as claimed in claim 1, wherein said bottom face is fastened to said annular surface.

4. The extruder die head, as claimed in claim 1, wherein said bottom face is flat and rests on a flat annular surface.

5. An extruder die head including an internal cylindrical mandrel and a jacket, which concentrically envelops said mandrel and between which an annular channel is formed that empties into a die slit and at least one line, which empties into said annular channel in an area opposite the die slit for feeding a melt, wherein the improvement comprises a blind borehole of a die body forming said jacket and receiving said cylindrical mandrel and forming an inside wall that defines with said mandrel said annular channel;

said channel extending between a peripheral surface of said mandrel and its face up to and into a transition region; said melt-feeding line emptying into said transition region;

said face of said mandrel inside said transition region contacting sealingly with a floor of said die body; said peripheral surface and said face of said mandrel having at least one spiral groove, which helically runs over the transition region into the peripheral surface of the mandrel and starts in the transition region and whose depth decreases in the direction of the die slit; and said melt-feeding line emptying into an initial region of said at least one groove.

6. The extruder die head, as claimed in claim 5, wherein said face rest on a flat annular surface.

7. An extruder die head, comprising a die body, which forms a floor and on which an inside rotationally symmetrical core with a sealing face is mounted and connected, at least first and second rings, which envelop said core and whose faces rest sealingly against complementary annular surfaces of the floor and are connected to the core, said first ring enclosing the core and said second ring enclosing the first ring to define annular channels, which empty into a common die slit, the annular channels extending up to and into transition regions between peripheral surfaces of the core and the rings and their faces, and melt-feeding channels emptying into said transition regions, said peripheral regions of the faces of the core and the rings having one or more spiral grooves, which run helically over said transition regions into the peripheral regions of the core, said non grooves beginning in the peripheral regions and having a depth decreasing in the direction of the die slit, and said melt-feeding channels emptying into the initial regions of the grooves.

8. An extruder die head which comprises a cylindrical mandrel and a jacket which concentrically envelopes said mandrel to form cylindrical mating surfaces that define an annular channel which empties into a die slit and at least one spiral groove for feeding a melt to said annular channel; said mandrel and said jacket also having sealingly connected mating surfaces, separate from said cylindrical mating surfaces which form an annular surface between said mandrel and said jacket, said spiral groove having a beginning starting in said annular surface and at least one feed line for feeding said melt to said groove at its beginning in said annular surface, said mandrel and said jacket defining a transition region between said cylindrical mating surfaces and said annular surface, and said spiral groove being over said transition region.

9. The extruder die head, as claimed in claim 8, wherein said annular surface between said mandrel and said jacket is approximately perpendicular to said cylindrical mating surfaces of said mandrel and said jacket.

10. The extruder die head, as claimed in claim 8, wherein said annular surface is formed by an upper surface of a flange-shaped foot extending from said mandrel and a bottom face of said jacket.

11. The extruder die head, as claimed in claim 8, wherein said annular surface is formed by a floor of a blind bore hole of a die body forming said jacket and a bottom surface of said mandrel.

12. The extruder die head, as claimed in claim 8, wherein said transition region is rounded off.

13. The extruder die head, as claimed in claim 8, wherein said face is fastened to said floor of said annular surface.

14. The extruder die head as claimed in claim 12, wherein said face rest on a flat annular surface.

* * * * *